(12) United States Patent
Kajita et al.

(10) Patent No.: US 7,661,769 B2
(45) Date of Patent: Feb. 16, 2010

(54) BRAKE APPARATUS FOR A VEHICLE

(75) Inventors: Hidenobu Kajita, Ohbu (JP); Seiichi Kojima, Niwa gun (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 422 days.

(21) Appl. No.: 11/604,792

(22) Filed: Nov. 28, 2006

(65) Prior Publication Data

US 2007/0120418 A1 May 31, 2007

(30) Foreign Application Priority Data

Nov. 30, 2005 (JP) .............................. 2005-345855

(51) Int. Cl.
*B60T 8/44* (2006.01)
*B60T 13/12* (2006.01)

(52) U.S. Cl. .............. 303/114.1; 303/116.1; 303/119.1; 188/359

(58) Field of Classification Search .............. 303/113.1, 303/114.1, 114.2, 116.1, 116.2, 119.1; 60/547.1, 60/547.2, 552, 562, 581, 593; 188/151 R, 188/152, 355, 358, 359, 360
See application file for complete search history.

(56) References Cited

U.S. PATENT DOCUMENTS

| | | | |
|---|---|---|---|
| 5,960,630 A | 10/1999 | Nishii et al. | |
| 6,276,136 B1 | 8/2001 | Oishi et al. | |
| 6,709,072 B2 * | 3/2004 | Kusano et al. | 303/113.1 |
| 6,957,871 B2 * | 10/2005 | Maki | 303/114.1 |
| 7,410,223 B2 * | 8/2008 | Kusano et al. | 303/119.2 |
| 2002/0140283 A1 * | 10/2002 | Kusano et al. | 303/114.1 |
| 2003/0071518 A1 * | 4/2003 | Kusano et al. | 303/114.1 |
| 2003/0214180 A1 * | 11/2003 | Kusano | 303/116.2 |
| 2004/0227396 A1 * | 11/2004 | Kusano | 303/113.1 |

FOREIGN PATENT DOCUMENTS

| | | |
|---|---|---|
| JP | 11-180290 A | 7/1999 |
| JP | 2000-108859 A | 4/2000 |
| JP | 3101205 B2 | 8/2000 |
| JP | 3296235 B2 | 4/2002 |

* cited by examiner

*Primary Examiner*—Thomas J Williams
(74) *Attorney, Agent, or Firm*—Buchanan Ingersoll & Rooney PC

(57) ABSTRACT

A brake apparatus capable of applying a regulator pressure regulated by a regulator valve device to an assisting chamber, to obtain a smooth brake feeling, even when a brake pedal is operated by a vehicle driver, during an automatic braking operation. A first control valve is disposed in a power pressure passage for controlling hydraulic pressure in the assisting chamber to be increased. A changeover valve device is disposed in a regulator pressure passage for selecting either one of a communicating state and a shutting-off state of the passage. A second control valve is connected to the regulator pressure passage between the changeover valve device and the assisting chamber, and controls the hydraulic pressure in the assisting chamber to be decreased.

11 Claims, 8 Drawing Sheets

BRAKE APPARATUS FOR A VEHICLE

This application claims priority under 35 U.S.C. Sec. 119 to No. 2005-345855 filed in Japan on Nov. 30, 2005, the entire content of which is herein incorporated by reference.

BACKGROUND

The present invention relates to a brake apparatus for a vehicle, and more particularly to the apparatus capable of applying a regulator pressure regulated by a regulator valve device to an assisting chamber formed backward of a master piston.

In general, as for the brake apparatus capable of applying the regulator pressure to the assisting chamber formed backward of the master piston, it is disclosed in Japanese Patent No. 3101205, for example. That is, the brake apparatus includes a master piston, which is fluid-tightly slidably disposed in a cylinder body, to form a pressure chamber in front of the master piston and a power chamber behind it, and moved in response to operation of a manually operated braking member, to discharge a hydraulic braking pressure from the pressure chamber, an auxiliary hydraulic pressure source which pressurizes the brake fluid up to a predetermined pressure, and discharges a power pressure, a control piston which is fluid-tightly slidably accommodated in the cylinder body and arranged to be moved in response to movement of the control piston, and regulator valve means which introduces the power pressure discharged from the auxiliary hydraulic pressure source into a regulator chamber, to regulate the power pressure into a predetermined pressure in response to movement of the control piston. The hydraulic pressure regulated by the regulator valve means is applied to the power chamber of the master cylinder, to assist the operation of the manually operated braking member. With respect to the brake apparatus capable of applying the regulator pressure regulated by the regulator valve means to the power chamber (assisting chamber) as described above, Japanese Patent Laid-open Publication No. 11-180290 discloses hydraulic pressure relationships among various parts, in detail.

Recent vehicles require an automatic braking control, which is adapted to measure a distance or speed difference between a vehicle by a driver and another vehicle traveling ahead thereof to determine a necessity for decreasing the vehicle speed, and perform a braking operation automatically to decrease the vehicle speed, unless a vehicle driver operates an accelerator pedal, and which is called as "ACC" (abbreviation of "Adaptive Cruise Control"). And, a control apparatus which is capable of performing the automatic braking control is getting popular. During the automatic braking control operation as described above, when a vehicle driver operates a brake pedal, the automatic braking operation shall be cancelled, and shifted to the braking operation performed in response to operation of the brake pedal by the vehicle driver.

For example, Japanese Patent Laid-open Publication No. 2000-108859 proposes a braking control apparatus, which is aimed to perform the automatic braking operation, and cancel it, when it is detected that the brake pedal has been operated by a driver, and discloses an embodiment using a hydraulic booster as an actuator. According to this braking control apparatus, the vehicle can be braked automatically, so as to keep a certain distance between the vehicle driven by the driver and another vehicle traveling ahead thereof detected by a sensor, and can be braked to provide an emergent braking operation.

Also, Japanese Patent No. 3296235 proposes a braking force control apparatus, which is aimed to produce a hydraulic braking pressure larger than a normal pressure, when the emergent braking operation was performed by the vehicle driver, and reflect an intention of the vehicle driver on the hydraulic braking pressure, and which is capable of performing a so-called brake assist control. For example, there are provided an increased assisting pressure state for holing the hydraulic braking pressure larger than the normal pressure, and a decreased assisting pressure state for decreasing the hydraulic braking pressure irrespective of operation of the brake pedal.

As described in the Japanese Patent Laid-open Publication No. 2000-108859 or Japanese Patent No. 3296235, as for the automatic braking control apparatus for performing an automatic pressure increasing control as required, irrespective of operation of the brake pedal, to perform the braking operation automatically, various types of the apparatus have been known heretofore, so that their controlling state are different depending upon their objects, and their responses, which are taken when the automatic braking operation is shifted to the brake pedal operation by the vehicle driver, are different from each other. Particularly, in the case where the brake pedal is operated by the driver, in such a state that the braking operation is being performed, as a result of determination that the distance between the vehicle driven by the driver and another vehicle traveling ahead thereof has become to be smaller than a predetermined distance, for example, such as the above-described automatic braking control, it is desired that a smooth brake feeling shall be given to the driver.

However, according to the braking control apparatuses as disclosed in the Japanese Patent Laid-open Publication No. 2000-108859 or Japanese Patent No. 3296235, when the braking operation is shifted to the one operated by the brake pedal, there may be a case where the smooth brake feeling can not be expected. As described in paragraphs [0054] and [0055] of the Publication No. 2000-108859, for example, when the hydraulic pressure is fed from an accumulator to all of front and rear wheels, the brake pedal will hardly stroke, to provide a so-called "depressing board" state, which is inappropriate. Also, the Publication No. 2000-108859 discloses an embodiment, where the brake pressure shall not be supplied to a front wheel brake cylinder not to be controlled, during the automatic braking operation. According to this embodiment, the brake pressure will be supplied only to rear wheel brake cylinders, during the automatic braking operation, so that a desired braking operation may not be performed.

Furthermore, the braking control performed by the apparatus as described in Japanese Patent No. 3296235 is different from the braking control according to the present invention, which is performed by the braking control apparatuses as described in Japanese Patent No. 3101205 and Publication No. 11-180290, so that the relationships of the pressures in the braking control apparatuses are different from each other. Therefore, countermeasures as described in Japanese Patent No. 3296235 can not be employed, as they are. Particularly, while the brake assist operation is being performed in case of the emergent braking operation, the communication between the master cylinder and wheel brake cylinder is forced to be blocked, so that the "depressing board" feeling will be given to the driver. In order to avoid this, such a countermeasure as providing a so-called stroke simulator will be required.

SUMMARY

Accordingly, it is an object of the present invention to provide a brake apparatus capable of applying a regulator pressure regulated by a regulator valve device to an assisting chamber, to obtain a smooth brake feeling, even when a brake pedal is operated by a vehicle driver, during an automatic braking operation for decreasing a vehicle speed in response to a distance or speed difference between a vehicle driven by the driver and another vehicle traveling ahead thereof, or during a brake assist operation to an emergent braking operation.

In accomplish the above and other objects, a brake apparatus comprises a master cylinder having a master piston moved in response to operation of a manually operated braking member, and defining a master pressure chamber in front of the master piston and an assisting chamber behind the master piston, to discharge a master cylinder pressure from the master pressure chamber in response to advancing movement of the manually operated braking member, a hydraulic pressure source for pressurizing brake fluid independently of the operation of the manually operated braking member, to generate a power pressure, and a regulator valve device for introducing the power pressure generated by the hydraulic pressure source into a regulator chamber in response to the movement of the master piston, to discharge a regulator pressure from the regulator chamber, which is communicated with the assisting chamber to be capable of applying the regulator pressure to the assisting chamber, and a wheel brake cylinder operatively mounted on a wheel of the vehicle, and included in at least one hydraulic pressure circuit system to be communicated with the master pressure chamber. A power pressure passage is provided for communicating the hydraulic pressure source with the assisting chamber to be capable of introducing the power pressure discharged from the hydraulic pressure source into the assisting chamber. A first control valve is disposed in the power pressure passage for controlling the hydraulic pressure in the assisting chamber to be increased. A regulator pressure passage is provided for communicating the regulator chamber with the assisting chamber to be capable of introducing the regulator pressure discharged from the regulator chamber into the assisting chamber. A changeover valve device is disposed in the regulator pressure passage for selecting either one of a communicating state and a shutting-off state of the regulator pressure passage. And, a second control valve is connected to the regulator pressure passage between the changeover valve device and the assisting chamber, and controls the hydraulic pressure in the assisting chamber to be decreased.

Preferably, a normally open switching valve is disposed in a passage between the master pressure chamber and the wheel brake cylinder in the one hydraulic pressure circuit system. And, another wheel brake cylinder included in another hydraulic pressure circuit system may be connected to the regulator pressure passage between the normally open switching valve and the assisting chamber. Furthermore, a normally closed switching valve may be disposed in a passage between the wheel brake cylinder included in the one hydraulic pressure circuit system and the another wheel brake cylinder included in the another hydraulic pressure circuit system.

In the brake apparatus as described above, the changeover valve device may comprise a normally open switching valve disposed in the regulator passage, and a check valve disposed in parallel with the normally open switching valve for allowing the brake fluid from the regulator chamber to the assisting chamber, and blocking the reverse flow. The first control valve and the second control valve may comprise a normally closed linear control valve, respectively.

Or, in stead of the changeover valve device and the second control valve according to the brake apparatus as described above, a normally open switching valve may be disposed in a passage between the master pressure chamber and the wheel brake cylinder in the one hydraulic pressure circuit system, and a third control valve may be disposed in the regulator pressure passage for controlling the hydraulic pressure in the assisting chamber to be decreased. In parallel with the third control valve, the check valve may be disposed.

BRIEF DESCRIPTION OF THE DRAWINGS

The above stated objects and following description will become readily apparent with reference to the accompanying drawings, wherein like reference numerals denote like elements, and in which.

DETAILED DESCRIPTION OF EMBODIMENTS

Figure 1:
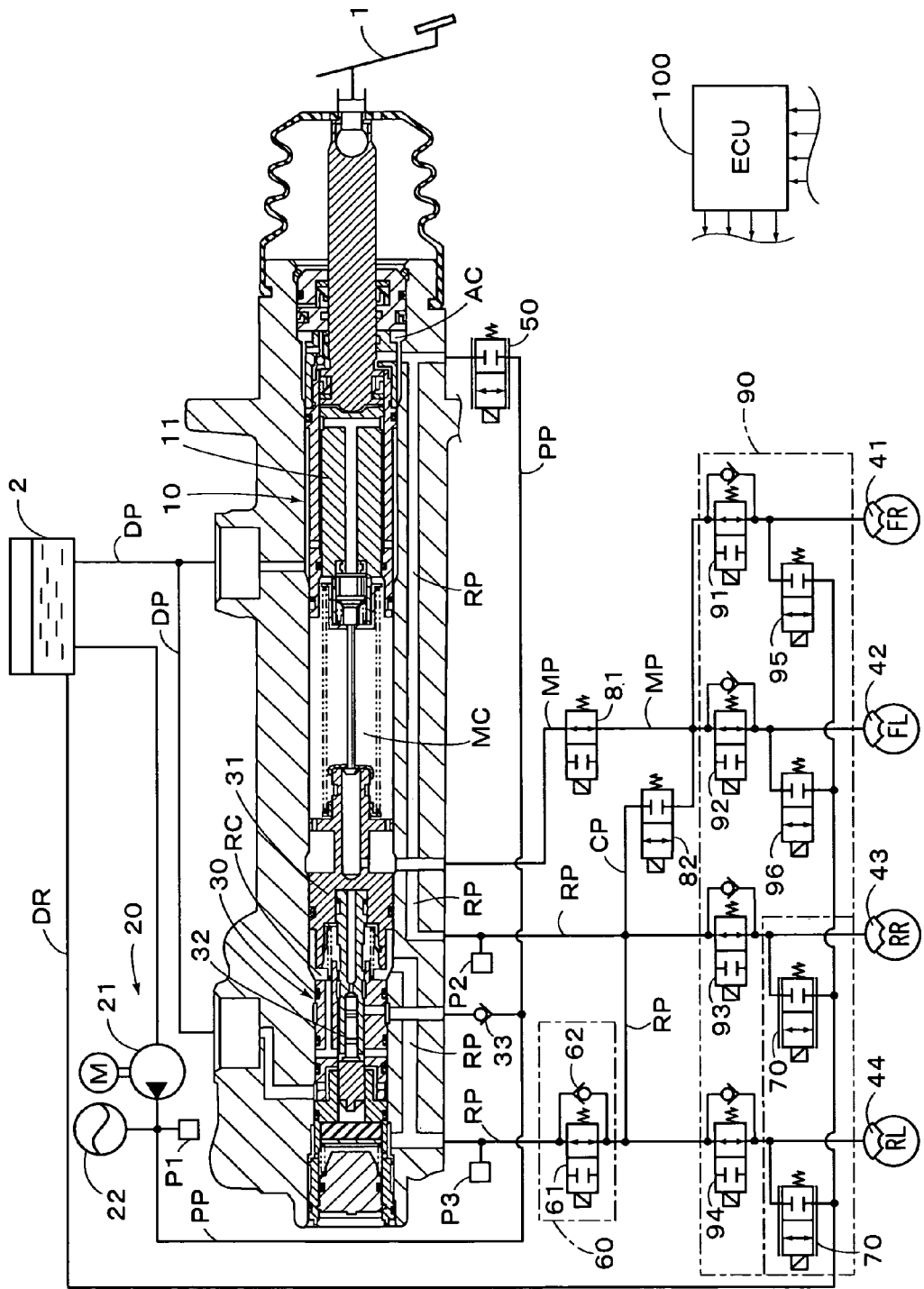
FIG. 1 is a cross sectional view of a hydraulic brake apparatus in its inoperative state, according to an embodiment of the present invention.

Referring to FIG. 1, there is illustrated a brake apparatus for a vehicle according to an embodiment of the present invention, which includes a master cylinder 10 having a master piston 11 moved in response to operation of a brake pedal 1 served as a manually operated braking member, and defining a master pressure chamber MC in front of the master piston 11 and an assisting chamber AC behind the master piston 11, to discharge a master cylinder pressure from the master pressure chamber MC, with the master piston 11 being advanced in response to operation of the brake pedal 1, and includes a hydraulic pressure source 20 for pressurizing brake fluid independently of the operation of the brake pedal 1, up to a predetermined pressure, to generate a power pressure. Furthermore, a regulator valve device 30 is provided for introducing the power pressure generated by the hydraulic pressure source 20 into a regulator chamber RC in response to the movement of the master piston 11, to regulate it into a regulator pressure. Wheel brake cylinders 41 and 42 are operatively mounted on wheels FR and FL in one hydraulic pressure circuit system to be communicated with the master pressure chamber MC of the master cylinder 10. And, it is so constituted that the regulator chamber RC is communicated with the assisting chamber AC to be capable of applying the regulator pressure to the assisting chamber AC, thereby to act as a hydraulic pressure assisting device. According to the present embodiment, the master piston 11 is divided into a first piston and a second piston, as disclosed in the aforementioned Publication No. 11-180290, wherein the second piston acts as a power piston of the hydraulic pressure assisting device. However, the master piston 11 is simply explained to include both of them, without distinguishing them, hereinafter.

According to the present embodiment, the hydraulic pressure source 20 includes an electric motor M controlled by an electronic control unit (ECU) 100, and a hydraulic pressure pump 21, which is driven by the electric motor M, and whose inlet is connected to a reservoir 2, and whose outlet is connected to an accumulator 22. According to the present embodiment, a pressure at the outlet of the accumulator 22 is monitored by a pressure sensor P1. On the basis of the monitored result, the motor M of the hydraulic pressure pump 21 is controlled by the electronic control unit 100 to keep a power pressure discharged from the hydraulic pressure source 20 to be a hydraulic pressure (accumulator pressure) between predetermined upper limit and lower limit. Thus, the hydraulic pressure discharged from the hydraulic pressure pump 21 is regulated into the accumulator pressure to be discharged, which is called as the power pressure discharged from the hydraulic pressure source 20, in the present embodiment. As the structures of master cylinder 10, regulator valve device 30, hydraulic pressure assisting device and the like are disclosed in the aforementioned Publication No. 11-180290, the detailed explanations of those are omitted herein, while their operations will be explained together with other components, hereinafter.

Figure 8:
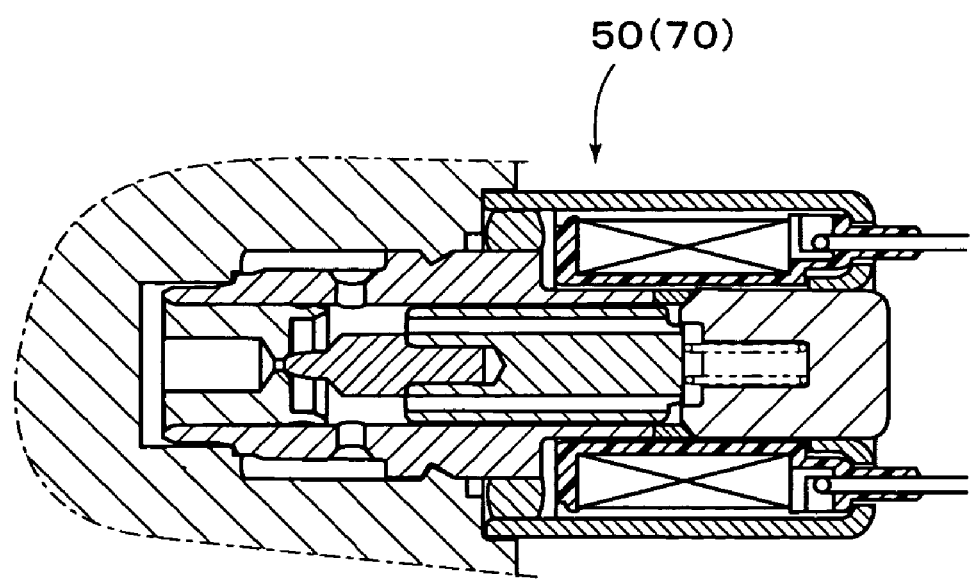
FIG. 8 is a cross sectional view of an example of a linear control valve for use in a hydraulic brake apparatus according to the present invention.
Figure 9:
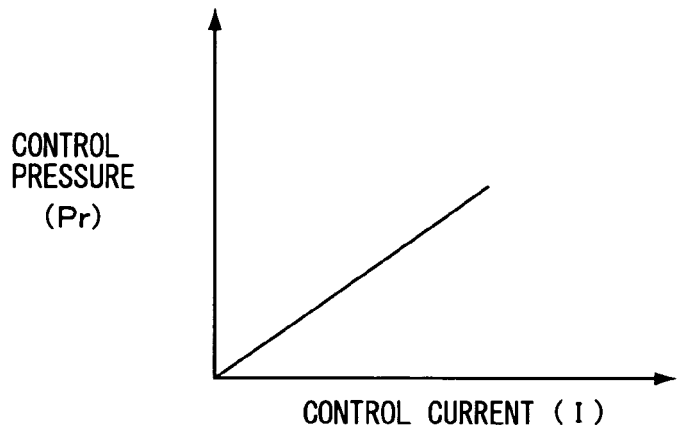
FIG. 9 is a graph showing a hydraulic pressure characteristic of a linear control valve 50 as shown in FIGS. 1-5.

As shown in FIG. 1, a power pressure passage PP is provided for communicating the hydraulic pressure source 20 with the assisting chamber AC to be capable of introducing the power pressure discharged from the hydraulic pressure source 20 into the assisting chamber AC. A normally closed linear control valve 50 served as a first control valve for controlling the hydraulic pressure in the assisting chamber AC is disposed in the power pressure passage PP. The linear control valve 50 is a solenoid operated linear differential pressure regulating valve, whose structure is as illustrated in FIG. 8, for example, and at the downstream of which the hydraulic pressure is controlled to have such a characteristic as being increased to provide a control pressure (Pr), in proportion to increase of a control electric current (I), as shown in FIG. 9. And, a regulator pressure passage RP is provided for communicating the regulator chamber RC with the assisting chamber AC to be capable of introducing the regulator pressure into the assisting chamber AC. As for a changeover valve device 60 for selecting either one of a communicating state and a shutting-off state of the regulator pressure passage RP, a normally open electromagnetic switching valve 61 is disposed in the regulator pressure passage RP. In parallel with the electromagnetic switching valve 61, there is disposed a check valve 62, which allows the brake fluid from the regulator chamber RC to the assisting chamber AC, and blocks the reverse flow. The regulator pressure passage RP includes a passage, which is formed in the housing of the master cylinder 10 and regulator valve device 30 as shown in FIG. 1, and which is divided into other passages as described later.

Figure 10:
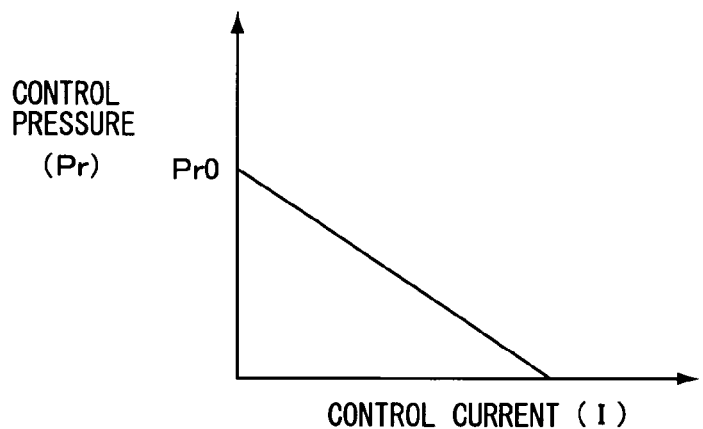
FIG. 10 is a graph showing a hydraulic pressure characteristic of a linear control valve 70 as shown in FIGS. 1-5.

And, a normally closed linear control valve 70 served as a second control valve is disposed in the regulator pressure passage RP between the electromagnetic switching valve 61 served as the changeover valve device 60 and the assisting chamber AC. The linear control valve 70 is a solenoid operated linear differential pressure regulating valve, whose structure is the same as illustrated in FIG. 8, for example, and at the upstream of which the hydraulic pressure is controlled to have such a characteristic as being decreased to provide the control pressure (Pr), in proportion to increase of the control electric current (I), as shown in FIG. 10, wherein "Pr0" indicates its upper limit. Furthermore, wheel brake cylinders 43 and 44 included in another hydraulic pressure circuit system are arranged to be communicated with the regulator pressure passage RP between the electromagnetic switching valve 61 and the assisting chamber AC. According to the present embodiment, the wheel brake cylinders 41 and 42 in one hydraulic pressure circuit system are wheel braking devices provided in a front hydraulic pressure circuit system for applying the braking force to the front wheels FR and FL, and the wheel brake cylinders 43 and 44 in another hydraulic pressure circuit system are wheel braking devices provided in a rear hydraulic pressure circuit system for applying the braking force to the rear wheels RR and RL, whereby a so-called front-rear circuit system is formed. In the present embodiment, a pair of linear control valves 70, 70 are connected at the upstream of the wheel brake cylinders 43 and 44. However, as the wheel brake cylinders 43 and 44 are communicated with each other, either one of the linear control valves 70, 70 may be employed.

And, a normally open electromagnetic switching valve 81 is disposed in a master pressure passage MP between the master pressure chamber MC of the master cylinder 10 and the front wheel brake cylinders 41 and 42. The electromagnetic switching valve 81 is called as a cut-off valve, in view of its function for cutting off the master cylinder pressure, and so constituted that the master cylinder pressure can be supplied to the wheel brake cylinders 41 and 42 thorough the electromagnetic switching valve 81 placed in its open position. Also, a normally closed electromagnetic switching valve 82 is disposed in a passage CP for communicating the wheel brake cylinders 41 and 42 (front hydraulic pressure circuit system) with the wheel brake cylinders 43 and 44 (rear hydraulic pressure circuit system). Accordingly, it is so constituted that when the electromagnetic switching valve 81 is placed in its closed position, and the electromagnetic switching valve 82 is placed in its open position, the regulator pressure can be supplied to the wheel brake cylinders 41 and 42, through the electromagnetic switching valves 61 and 82 (and, the electromagnetic switching valves 91 and 92, as will be described later) placed in their open positions.

In addition to the above structure, according to the present embodiment, a hydraulic pressure control device 90 is disposed between the electromagnetic switching valves 81 and 82 and the wheel brake cylinders 41 and 42, and between the electromagnetic switching valve 61 and the wheel brake cylinders 43 and 44, to control the wheel cylinder presser to be increased and decreased, together with the pair of linear control valves 70, 70, for the purposes of an antiskid control (abbreviated as ABS), traction control (TRC), vehicle stability control (ESC or VSC) and the like. The above-described linear control valves 50 and 70, electromagnetic switching valves 61, 81 and 82, and hydraulic pressure control device 90 are controlled by the electronic control unit 100, as described later. Furthermore, there are disposed a pressure sensor P2 for detecting the assisting pressure in the assisting chamber AC, and a pressure sensor P3 for detecting the regulator pressure in the regulator chamber RC, the detected signals of which are fed to the electronic control unit 100, so that the operation of the brake pedal 1 can be detected on the basis of the pressure difference between the assisting pressure and the regulator pressure.

According to the present embodiment, the hydraulic pressure control device 90 is constituted by the electromagnetic switching valves 91-96 including the linear control valves 70, 70, to control the hydraulic braking pressure (wheel cylinder pressure) in case of the anti-skid control (ABS), for example. As shown in FIG. 1, the electromagnetic switching valves 91 and 95, and electromagnetic switching valves 92 and 96, for use in the control of supplying and draining the hydraulic pressure respectively, are disposed in the master pressure passage MP connected with the front wheel brake cylinders 41 and 42, respectively. Also, the electromagnetic switching valve 93 for use in the control of supplying and draining the hydraulic pressure and the linear control valve 70 for use in the control of draining the hydraulic pressure, and the electromagnetic switching valve 94 for use in the control of supplying and draining the hydraulic pressure and the linear control valve 70 for use in the control of draining the hydraulic pressure, are disposed in the regulator passage RP connected with the rear wheel brake cylinders 43 and 44, respectively. The electromagnetic switching valves 91-94 for supplying the hydraulic pressure are normally opened, and connected to each hydraulic circuit, respectively, whereas the linear control valve 70 and the electromagnetic switching valves 95 and 96 for draining the hydraulic pressure are connected to the reservoir 2, respectively. In parallel with each of the electromagnetic switching valves 91-94, a check valve is disposed, respectively, so that when the brake pedal 2 is released, the flow of brake fluid in the wheel brake cylinders 41-44 to the master cylinder 10 or the regulator valve device 30 is allowed, respectively, whereas its reverse flow is blocked.

In operation, in the case where the brake pedal 1 has not been depressed, and where the master cylinder 10, hydraulic pressure source 20, regulator valve device 30, hydraulic pressure assisting device and the like have been in their inoperative states, the master pressure chamber MC and regulator chamber RC are communicated with the reservoir 2 through a hydraulic passage DP, so that the master cylinder pressure and regulator pressure are not discharged. Also, in those inoperative states, the linear control valves 50 and 70, electromagnetic switching valves 61, 81 and 82, and hydraulic pressure control device 90 are placed in those states as shown in FIG. 1, i.e., every solenoid valves are de-energized to be placed in their normal positions.

Figure 2:
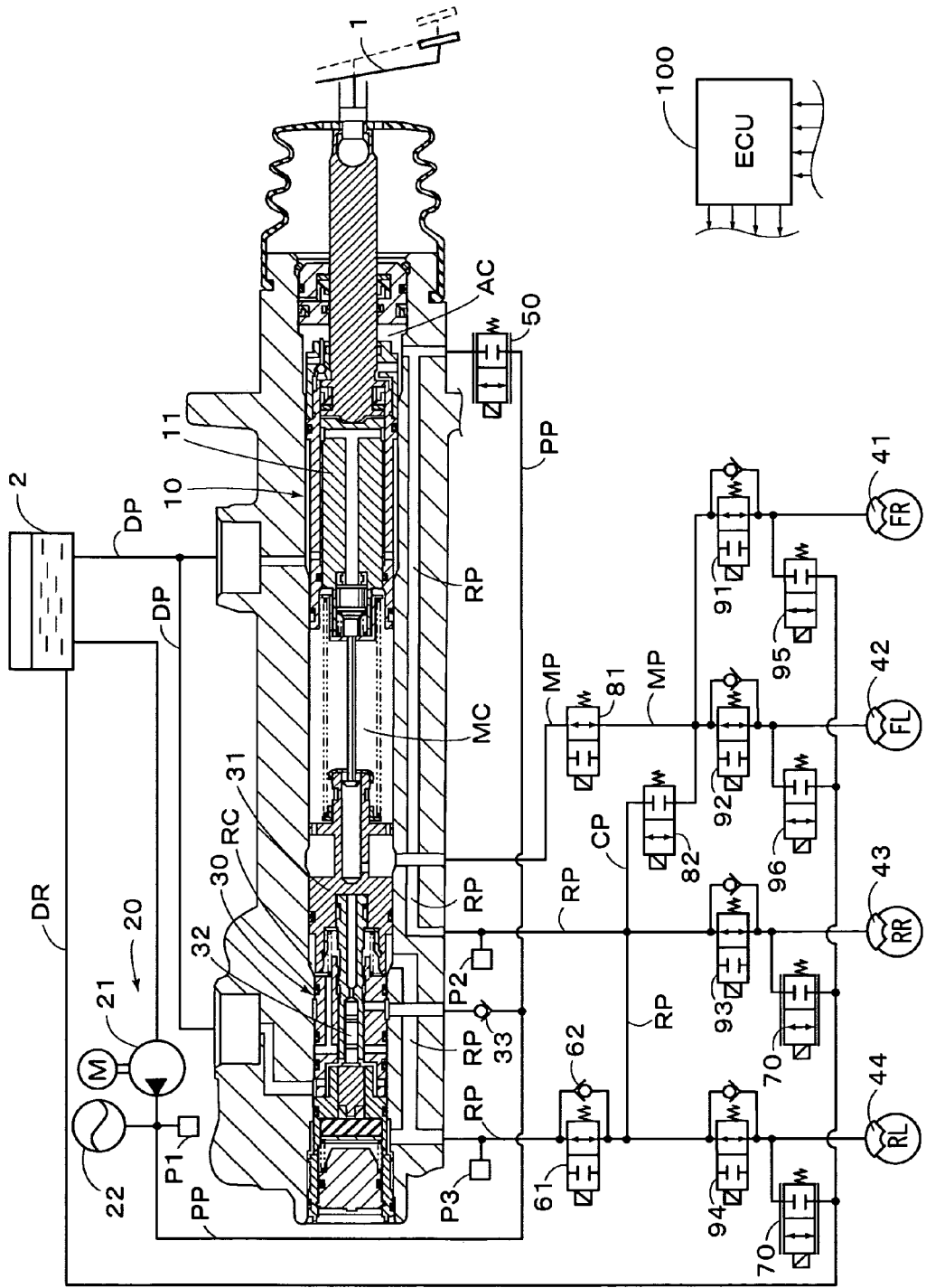
FIG. 2 is a cross sectional view of a hydraulic brake apparatus in its normal braking state, according to an embodiment of the present invention.

Next, when the brake pedal 1 is depressed to be shifted from its state as indicated by a broken line in FIG. 2, and placed in its state as indicated by a solid line in FIG. 2, to provide a normal braking operation, then the master piston 11 is pressed forward, i.e., moved leftward in FIG. 2, the master pressure chamber MC will be sealed. In this state, if the master piston 11 is advanced furthermore with the brake pedal 1 being operated, the master piston 11 is advanced together with the control piston 31 integrally. In response to this motion, a spool 32 supported on the control piston 31 is advanced to block the communication with the reservoir 2. Simultaneously, the power pressure generated by the hydraulic pressure source 20 is introduced into the regulator chamber RC through the power passage PP via the check valve 33. If the force applied to the control piston 31 with the hydraulic pressure in the regulator chamber RC is larger than the force applied to the control piston 31 with the master cylinder pressure in the master chamber MC, the control piston 31 will be moved backward, to communicate the regulator chamber RC with the reservoir 2 through the hydraulic passage DP, so that the hydraulic pressure in the regulator chamber RC will be decreased. If the balance of the forces applied to the control piston 31 becomes to be opposite to the balance as described above, the control piston 31 will be moved forward, to block its communication with the reservoir 2, instead, the regulator chamber RC will be communicated with the hydraulic pressure source 20 through the power passage PP and check valve 33, so that the hydraulic pressure in the regulator chamber RC will be increased. Thus, in accordance with a repetition of relative movement of the spool 32 to the control piston 31, the hydraulic pressure in the regulator chamber RO is regulated in such a manner that the force applied to the control piston 31 with the regulator pressure and the force applied to the control piston 31 with the master cylinder pressure will be equal to each other, whereby the regulator pressure will be discharged through the regulator pressure passage RP.

In the normal braking operation state as described above, the linear control valves 50 and 70, electromagnetic switching valves 61, 81 and 82, and hydraulic pressure control device 90 are placed in those states as shown in FIG. 2 (in the same states as shown in FIG. 1). Therefore, the regulator pressure discharged from the regulator pressure chamber RC is supplied to the assisting chamber AC through the regulator pressure passage RP and the electromagnetic switching valve 61 placed in its open position. With the regulator pressure being applied, the master piston 11 is assisted to advance, to compress the master pressure chamber MC furthermore, from which the master cylinder pressure is supplied to the wheel brake cylinders 41 and 42, as the hydraulic braking pressure, through the master pressure passage MP, the electromagnetic switching valve 81 placed in its open position, and the normally open electromagnetic switching valves 91 and 92 placed in their open positions. Also, the regulator pressure is supplied from the regulator chamber RC to the wheel brake cylinders 43 and 44, as the hydraulic braking pressure, through the regulator pressure passage RP, the electromagnetic switching valve 61 placed in its open position, and the electromagnetic switching valves 93 and 94 placed in their open positions.

Figure 3:
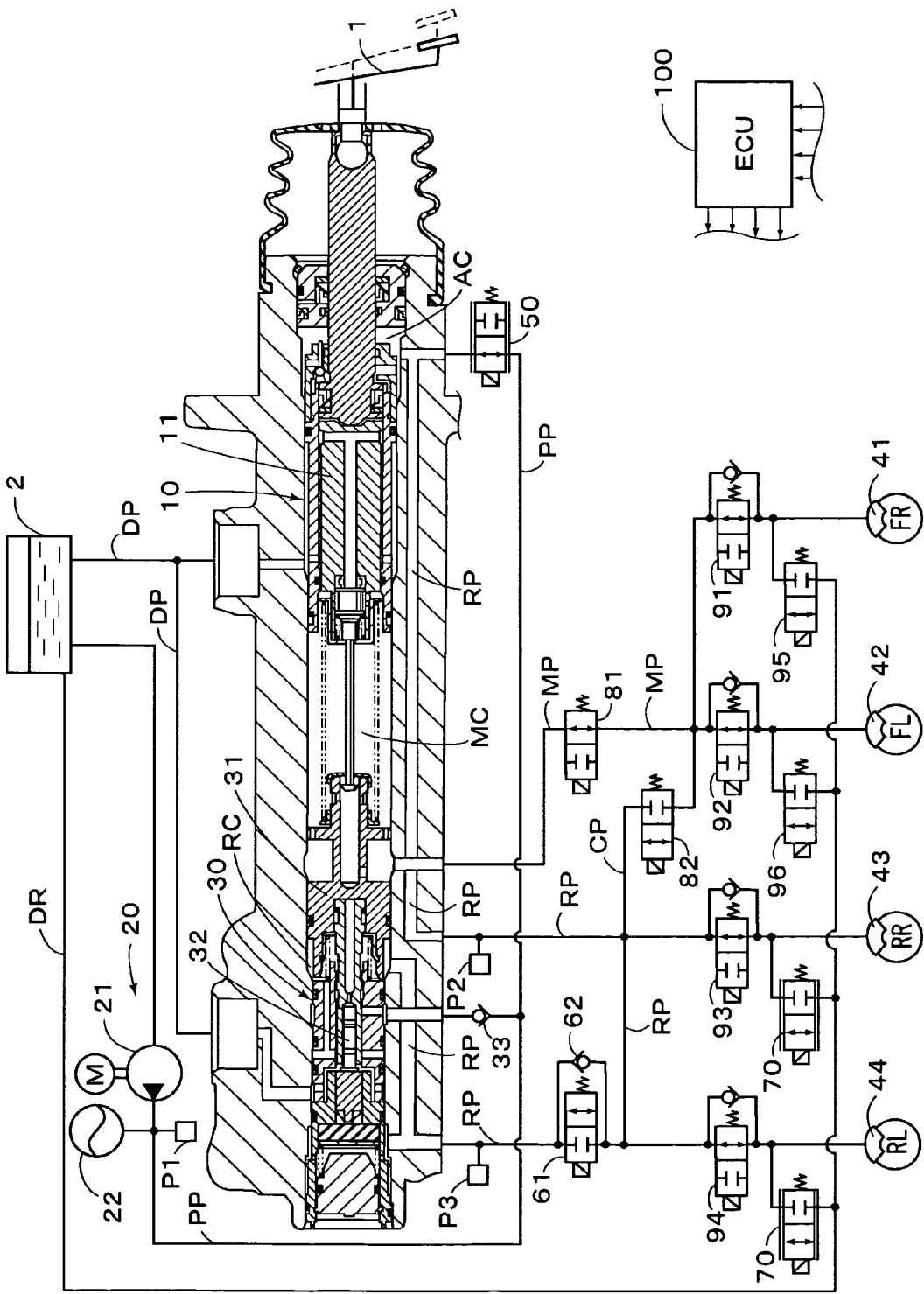
FIG. 3 is a cross sectional view of a hydraulic brake apparatus in its automatic braking state, according to an embodiment of the present invention.

On the other hand, when the brake pedal 1 is in its inoperative state, and the distance between the vehicle by the driver and another vehicle traveling ahead thereof becomes equal to or smaller than the predetermined distance, whereby it is determined that the automatic braking control is required, then an automatic braking mode as shown in FIG. 3 is provided to begin an automatic pressurizing control (when it begins, the brake pedal 1 is placed in its initial position as indicated by a broken line in FIG. 3). That is, the electromagnetic switching valve 61 is placed in its closed position, and the liner control valves 50 and 70 are controlled as described hereinafter, and the hydraulic braking pressure in the wheel brake cylinders 41-44 (wheel cylinder pressure) will be controlled to provide a desired pressure. At the outset, in case of increasing the wheel cylinder pressure, the liner control valve 50 is controlled (placed in its open position in FIG. 3), the power pressure discharged from the hydraulic pressure source 20 (accumulator pressure) is controlled to provide the pressure corresponding to a required vehicle deceleration, for example, and introduced into the assisting chamber AC, as the assisting pressure. Then, the assisting pressure is supplied from the assisting chamber AC to the wheel brake cylinders 43 and 44 through the regulator pressure passage RP, and the electromagnetic switching valves 93 and 94 placed in their open positions, to increase the wheel cylinder pressure. Also, with the assisting pressure being applied, the master piston 11 is driven to advance, so that the master cylinder pressure is supplied from the master pressure chamber MC to the wheel brake cylinders 41 and 42 through the master pressure passage MP, the electromagnetic switching valve 81 placed in its open position, and the electromagnetic switching valves 91 and 92 placed in their open positions, to increase the wheel cylinder pressure.

According to the regulator valve device 30 in this embodiment, with the brake pedal 1 being positioned in its inoperative state, and the master piston 11 is driven to advance with the above-described assisting pressure being applied, an area of the master piston 11 pressurized by the assisting pressure at that time is set to be smaller than the area of the control piston 31 applied by the regulator pressure. Therefore, according to a balance between the pressure applied to the master piston 11 and the pressure applied to the control piston 31, the value of the regulator pressure becomes smaller than that of the assisting pressure. Accordingly, without the brake fluid being fed into the assisting chamber AC or the wheel brake cylinders 43 and 44 through the check valve 62, the regulator chamber RC and the assisting chamber AC are separated from each other hydraulically by the electromagnetic switching valve 61 placed in its closed position and the check valve 62.

Next, in case of decreasing the wheel cylinder pressure, a pair (or, one) of linear control valves 70, 70 are controlled, so that the wheel brake cylinders 43 and 44 are communicated with the reservoir 2 through the linear control valves 70, 70 and a drain passage DR respectively, to decrease the wheel cylinder pressure in the wheel brake cylinders 43 and 44. Likewise, the assisting chamber AC is communicated with the reservoir 2 through the regulator pressure passage RP, the electromagnetic valves 93 and 94 placed in their open positions, the linear control valve 70 and the drain passage DR, respectively, to decrease the assisting pressure in the assisting chamber AC. As a result, the master cylinder pressure in the master pressure chamber MC is decreased to move the master piston 11 backward, so that the wheel cylinder pressure in the wheel brake cylinders 41 and 42 are decreased. In this case, a pair of linear control valves 70, 70 may be controlled simultaneously. Instead, as the wheel brake cylinders 41 and 42 are communicated with each other, only one of the linear control valves 70, 70 may be controlled.

While the above-described automatic braking operation is being performed, the brake pedal 1 moves together with the master piston 11, and the brake pedal 1 is held to be in its advanced position as indicated by the solid line in FIG. 3, in such a state that the assisting pressure is exerted in the assisting chamber AC. When the automatic braking operation is terminated, the electromagnetic switching valve 61 is placed in its open position as shown in FIG. 1 (and FIG. 2), the brake fluid in the wheel brake cylinders 41-44 is returned to the reservoir 2 through the electromagnetic valves 93 and 94 placed in their open positions, the electromagnetic switching valve 61 placed in its open position, the regulator valve device 30 under its inoperative state, and the hydraulic passage DP. Therefore, the brake pedal 1 is returned to its initial position as indicated by the broken line in FIG. 2.

Figure 4:
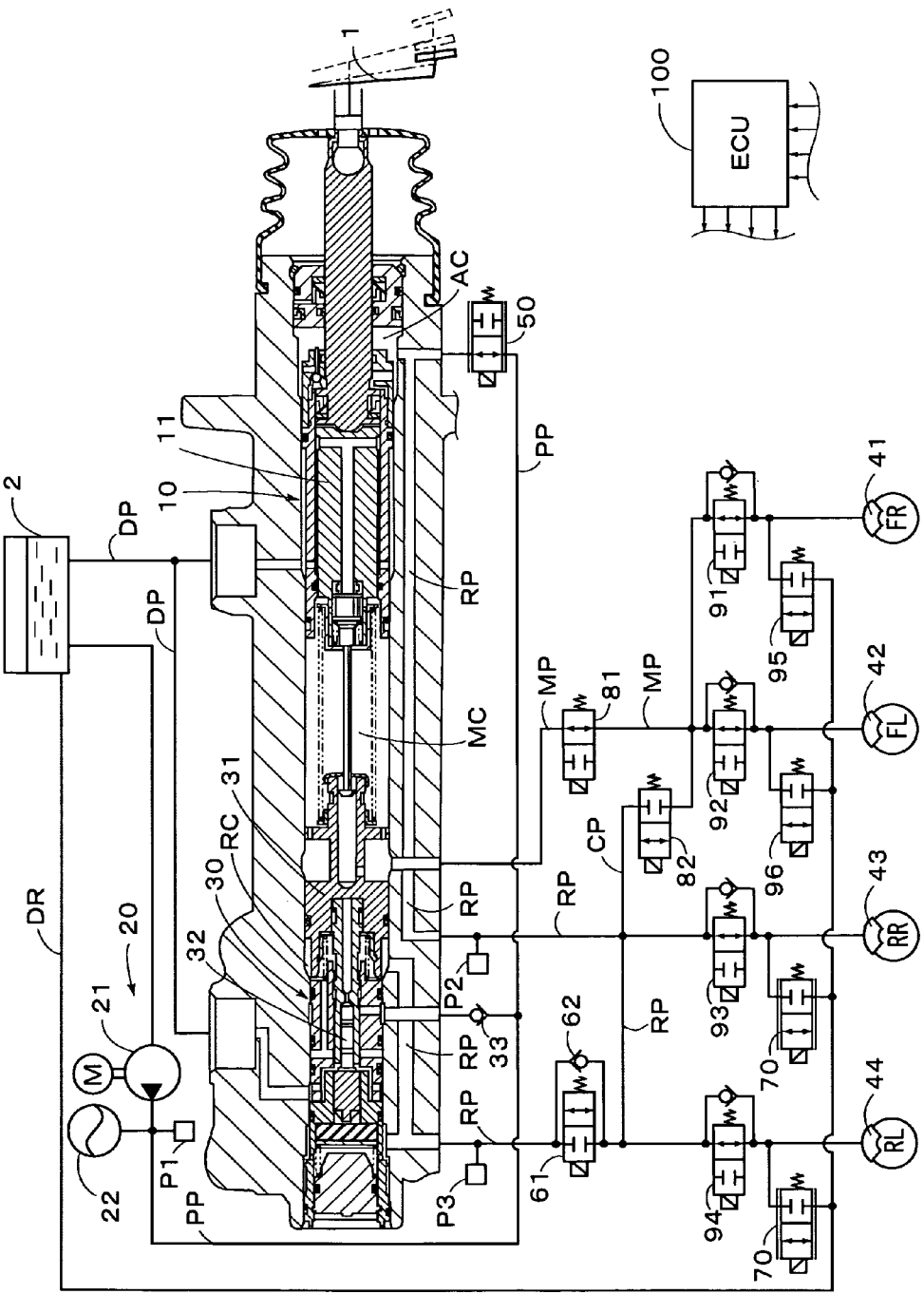
FIG. 4 is a cross sectional view of a hydraulic brake apparatus in such a state that a brake pedal is depressed in its automatic braking state, or a state that a brake assist operation is performed, according to an embodiment of the present invention.

Next, in such a state that the above-described automatic braking operation is being performed, when the driver has determined that the vehicle speed is to be decreased furthermore, the driver would begin to operate the brake pedal 1 at the position under the automatic braking operation as indicated by the solid line in FIG. 3 and a two-dot chain line in FIG. 4. Therefore, the driver can begin to operate the brake pedal 1 from the beginning position of its operation as indicated by the two-dot chain line in FIG. 4, in such a condition that he realizes that the braking operation begins in the state that the braking force has been applied, with the assisting pressure being exerted in the assisting chamber AC. Consequently, an appropriate depressing operation of the brake pedal 1 can be made without causing its excessive depression. As the operation of the brake pedal 1 can be detected on the basis of the result detected by the pressure sensors P2 and P3, the automatic braking operation can be canceled certainly, when the brake pedal 1 is depressed.

Accordingly, when the brake pedal 1 is operated as indicated by the solid line in FIG. 4, from the position as indicated by the two-dot chain line in FIG. 4, in other words, when the depression force of the brake pedal 1 is added to the master piston 11 in such a state that the assisting pressure is exerted in the assisting chamber AC, the driving force of the master piston 11 in its forward direction is increased by the added force, whereby the master cylinder pressure in the master pressure chamber MC is further increased, so that the wheel cylinder pressure in the wheel brake cylinders 41 and 42 will be increased. Also, the regulator valve device 30 is actuated through the control piston 31, with the forward movement of the master piston 11 being made, so that the regulator pressure discharged from the regulator chamber RC is increased. As a result, when the regulator pressure becomes to be larger than the assisting pressure in the assisting chamber AC, the regulator pressure is supplied to the wheel brake cylinders 43 and 44 through the check valve 62, to increase the wheel cylinder pressure, even if the electromagnetic switching valve 61 is placed in its closed position. Simultaneously, the increased regulator pressure is supplied to the assisting chamber AC as well, so that the assisting force applied to the master piston 11 is increased.

Thus, the state that the increased regulator pressure is supplied to the assisting chamber AC is the same as the state of normal braking operation, so that the master pressure chamber MC is always communicated with the wheel brake cylinders 41 and 42 even in the automatic braking operation, so that the master piston 11 moves forward in response to operation of the brake pedal 1. Therefore, without the so-called "depressing board" feeling being given, a smooth braking operation can be obtained, and the braking force can be increased, with a very natural brake feeling. And, during the automatic braking operation, the front hydraulic pressure circuit system for applying the breaking force to the vehicle wheels FR and FL and the rear hydraulic pressure circuit system for applying the braking force to the vehicle wheels RR and RL are separated. Therefore, without the hydraulic pressure being introduced from outside, the brake pedal 1 can begin to be depressed, at the position of the brake pedal 1 corresponding to the position for obtaining the deceleration in the normal braking operation. That is, the driver can begin to depress the brake pedal 1, in such a condition that he realizes that the braking operation begins in the state that the braking force has been applied, whereby a smooth depressing operation of the brake pedal 1 can be made without causing its excessive depression.

Instead of the above-described automatic braking operation, in the case where the driver depresses the brake pedal at a speed exceeding a predetermined speed, and where it is determined that an emergent braking operation is required, the assisting pressure in the assisting chamber AC is controlled to be increased in order to perform the so-called brake assist operation. In this case, there is disposed on the brake pedal 1, a stroke sensor (not shown) or depressing force sensor (not shown), the detected signal of which is fed to the electronic control unit 100, or the signal detected by the aforementioned pressure sensor P3 is used. For example, in the case where the brake pedal 1 is operated from the broken line to the solid line as shown in FIG. 4, and where it is determined that the operation speed of the brake pedal 1 has exceeded the predetermined speed, in the electronic control unit 100, on the basis of the detected signal of the stroke sensor or depressing force sensor, or on the basis of detection of a rapid increase made by the detected signal of the pressure sensor P3, then the electromagnetic switching valve 61 is placed in its closed position, and the linear control valve 50 is controlled. That is, in response to control of the linear control valve 50, the output power pressure (accumulator pressure) of the hydraulic pressure source 20 is controlled to provide a pressure for increasing the assisting pressure, which is fed into the assisting chamber AC. Then, the increased assisting pressure is supplied from the assisting chamber AC to the wheel brake cylinders 43 and 44 through the regulator pressure passage RP and the electromagnetic switching valves 93 and 94 placed in their open positions, to increase the wheel cylinder pressure. Also, the master piston 11 is driven to advance by the increased assisting pressure, so that the master cylinder pressure is fed from the master pressure chamber MC to the wheel brake cylinders 41 and 42 through the master pressure passage MP, the electromagnetic switching valve 81 placed in its open position, and the electromagnetic switching valves 91 and 92 placed in their open positions, to increase the wheel cylinder pressure.

Accordingly, the brake assist operation is performed, without giving the so-called "depressing board" feeling, to ensure a smooth braking operation, and the braking force can be increased, with a very natural brake feeling. In this case, the front hydraulic pressure circuit system and the rear hydraulic pressure circuit system are separated, and the hydraulic pressure is not introduced from outside, whereby the smooth braking operation can be ensured.

Figure 5:
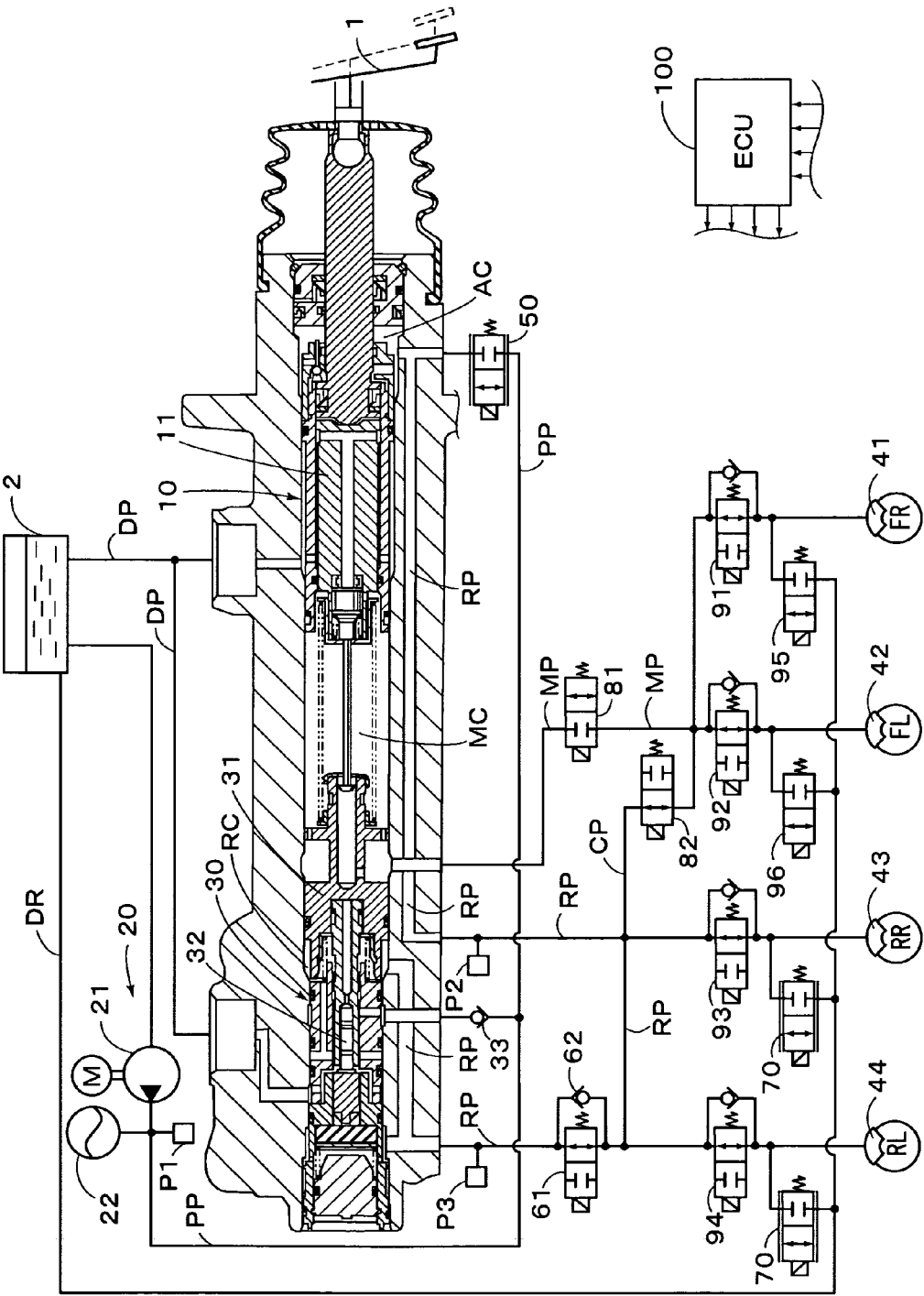
FIG. 5 is a cross sectional view of a hydraulic brake apparatus in its anti-skid controlling state, according to an embodiment of the present invention.

Next, when a slip of the wheel FR or the like is detected while the brake pedal 1 is being operated to provide a braking state, as indicated by a solid line in FIG. 5, which is different from the automatic braking operation and the brake assist operation, the electromagnetic switching valves or the like are positioned in such a state as shown in FIG. 5, so that the anti-skid control, i.e., increasing and decreasing pressure control, begins. That is, in the state that the electromagnetic switching valve 61 and linear control valve 50 are placed in open position and closed position, respectively, an electromagnetic switching valve 81 is placed in its closed position, and an electromagnetic switching valve 82 is placed in its open position, like in the normal braking operation. Therefore, the regulator pressure discharged from the regulator chamber RC is supplied to the wheel brake cylinders 43 and 44 as the control pressure, through the electromagnetic switching valve 61 placed in its open position, and the electromagnetic switching valves 93 and 94 placed in their open positions. Also, this regulator pressure is supplied to the assisting chamber AC through the regulator pressure passage RP and the electromagnetic switching valve 61 placed in its open position, and supplied to the wheel brake cylinders 41 and 42 as the control pressure, through the regulator pressure passage RP, the electromagnetic switching valve 82 placed in its open position, and the electromagnetic switching valves 91 and 92 placed in their open positions.

The hydraulic pressure control to be increased or decreased for the anti-skid control is performed by controlling the electromagnetic switching valves 91-96 which constitute the hydraulic pressure control device 90, and a pair of linear control valves 70, 70 (in this case, acting as control valves for decreasing the pressure) are properly controlled. That is, the electromagnetic switching valves 91-96 and a pair of the linear control valves 70, 70 are controlled by the electronic control unit 100 to be opened or closed, thereby to control the hydraulic braking pressure in each of the wheel brake cylinders 41-44 to be rapidly increased, gradually increased (pulse increase mode), gradually decreased (pulse decrease mode), rapidly decreased, or held, in response to the signals detected by each sensor (not shown), so that the hydraulic pressure control required for the anti-skid control can be made. In this respect, the hydraulic pressure control as described above is not directly related to the present invention, so that explanation of its operation is omitted herein. In addition, during the pressure increasing or decreasing control required for the anti-skid control, the master pressure chamber MC is held to block the communication by means of the electromagnetic switching valve 81 which acts as the cut-off valve, so that the brake pedal 1 is prevented from being advanced further than the distance as required. Therefore, the depression force to the brake pedal 1 can reflect an intention of the driver according to the operation of the regulator valve device 30, whereas a change of the wheel cylinder pressure during the anti-skid control is prevented from being transmitted to the driver as an unpleasant change.

Figure 6:
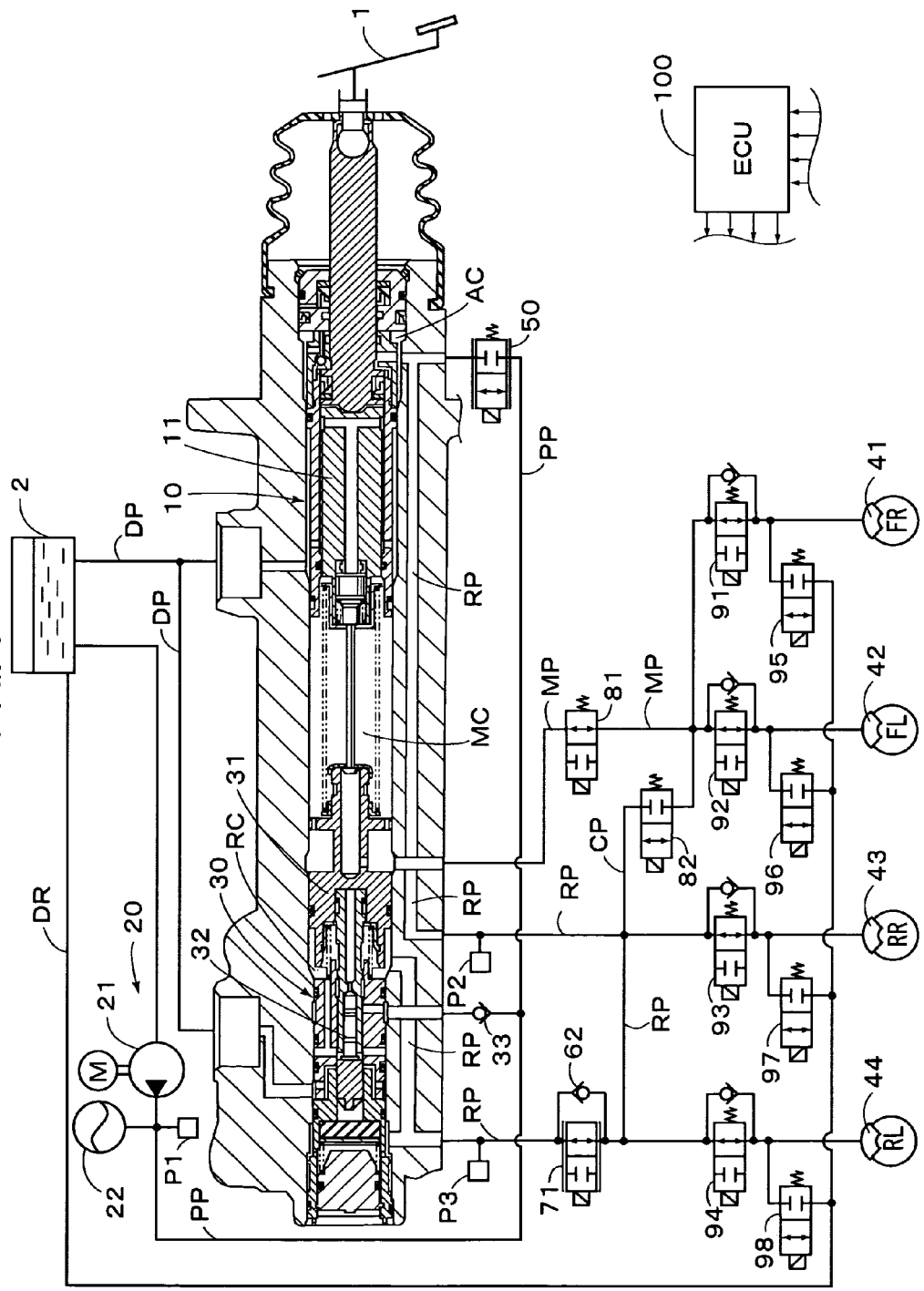
FIG. 6 is a cross sectional view of a hydraulic brake apparatus in its inoperative state, according to another embodiment of the present invention.
Figure 11:
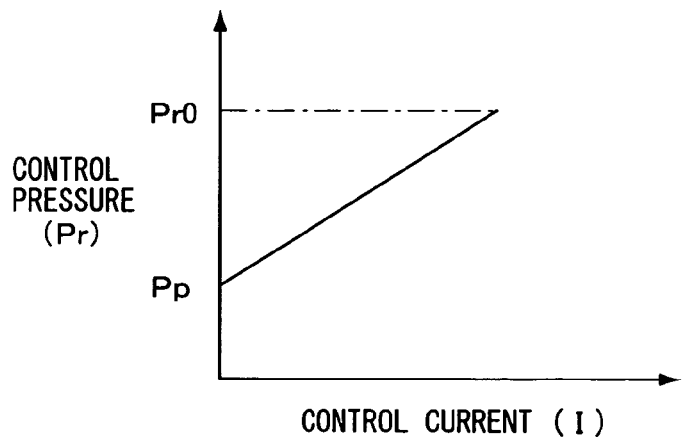
FIG. 11 is a graph showing a hydraulic pressure characteristic of a linear control valve 71 as shown in FIG. 6.

FIG. 6 shows an another embodiment of the present invention, wherein instead of a pair of the linear control valves 70, 70 as shown in FIG. 1, employed are electromagnetic switching valves 97 and 98, which are similar to the electromagnetic switching valves 95 and 96, and wherein instead of the electromagnetic switching valve 61, a normally open linear control valve 71 is used as a third control valve, to act as the pressure decreasing control valve. This linear control valve 71 is a linear differential pressure solenoid valve having a structure similar to that shown in FIG. 8, for example, and it is normally placed in its open position, and it has such a characteristic that the hydraulic pressure at its downstream position is to provide a control pressure (Pr) which is decreased in proportion to decrease of a control current (I), as shown in FIG. 11, where "Pr0" indicates its upper limit and "Pp" indicates the regulator pressure at its upstream position. In the automatic braking operation, the linear control valve 71 is turned on to be placed in its closed position, to block the communication between the regulator chamber RC and the assisting chamber AC. Then, the wheel cylinder pressure is controlled to be increased, by controlling electric current of the linear control valve 50. On the other hand, by decreasing the control current of the linear control valve 71, the wheel cylinder pressure acting as the control pressure is controlled to be decreased. According to the present embodiment, therefore, comparing with the embodiment as shown in FIG. 1, the number of linear control valves can be reduced by one. Furthermore, instead of the linear control valve 71, a simple electromagnetic switching valve such as the electromagnetic switching valve 61 may be used, and may be controlled to be opened or closed. In this case, a pulsation pressure in braking operation might be large during the control, and vibration noise might become large. However, effect of reduction in cost is large.

Figure 7:
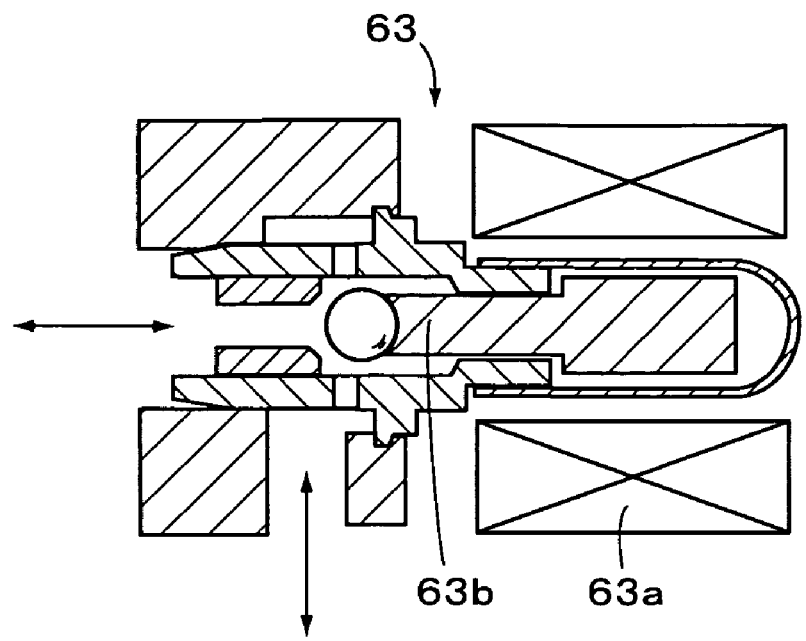
FIG. 7 is a cross sectional view of an over all structure of an electromagnetic switching vale for use in a hydraulic brake apparatus according to a further embodiment of the present invention.

Also, as a further embodiment of the present invention, instead of the check valve 62 disposed in parallel with the electromagnetic switching valve 61 as shown in FIG. 1, an electromagnetic switching valve 63, whose structural outline is shown in FIG. 7, may be employed to act as the check valve 62. As shown in FIG. 7, the electromagnetic switching valve 63 is not provided with biasing means such as a spring member for holding a valve body 63b to be placed in its closed position, when it is turned off. It is so constituted that a solenoid 63a is turned on (energized) during the automatic braking operation, and it is turned off (de-energized) when the valve body 63b is placed in its closed position, so that its holding state can be maintained by the differential pressure between the regulator pressure and the assisting pressure. According to this embodiment, when the brake pedal 1 is depressed during the automatic braking operation, it operates as described before, to increase the regulator pressure. However, as no spring member exists, the regulator pressure is drained into the assisting chamber. Thus, in this embodiment, the check valve 62 is not required. Therefore, a further minimization and reduction in cost can be expected.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake apparatus for a vehicle comprising:
   a master cylinder having a master piston moved in response to operation of a manually operated braking member, and defining a master pressure chamber in front of said master piston and an assisting chamber behind said master piston, to discharge a master cylinder pressure from said master pressure chamber in response to advancing movement of said manually operated braking member;
   a hydraulic pressure source for pressurizing brake fluid independently of the operation of said manually operated braking member, to generate a power pressure;
   regulator valve means for introducing the power pressure generated by said hydraulic pressure source into a regulator chamber in response to the movement of said master piston, to discharge a regulator pressure from said regulator chamber, said regulator chamber being communicated with said assisting chamber to be capable of applying the regulator pressure to said assisting chamber;
   a wheel brake cylinder operatively mounted on a wheel of said vehicle, and included in at least one hydraulic pressure circuit system to be communicated with said master pressure chamber;
   a power pressure passage for communicating said hydraulic pressure source with said assisting chamber to be capable of introducing the power pressure discharged from said hydraulic pressure source into said assisting chamber;
   a first control valve disposed in said power pressure passage for controlling the hydraulic pressure in said assisting chamber to be increased;
   a regulator pressure passage for communicating said regulator chamber with said assisting chamber to be capable of introducing the regulator pressure discharged from said regulator chamber into said assisting chamber;
   changeover valve means disposed in said regulator pressure passage for selecting either one of a communicating state and a shutting-off state of said regulator pressure passage; and
   a second control valve connected to said regulator pressure passage between said changeover valve means and said assisting chamber, for controlling the hydraulic pressure in said assisting chamber to be decreased;
   wherein when said manually operated braking member is in an inoperative state thereof, said first control valve is placed in an open position thereof to supply the power pressure discharged from said hydraulic pressure source to said assisting chamber, to advance said master piston and said manually operated braking member.

2. A brake apparatus as set forth in claim 1, wherein a normally open switching valve is disposed in a passage between said master pressure chamber and said wheel brake cylinder in said one hydraulic pressure circuit system.

3. A brake apparatus as set forth in claim 2, wherein another wheel brake cylinder included in another hydraulic pressure circuit system is connected to said regulator pressure passage between said normally open switching valve and said assisting chamber.

4. A brake apparatus as set forth in claim 3, wherein a normally closed switching valve is disposed in a passage between said wheel brake cylinder included in said one hydraulic pressure circuit system and said another wheel brake cylinder included in said another hydraulic pressure circuit system.

5. A brake apparatus as set forth in claim 1, wherein said changeover valve means comprises a normally open switching valve disposed in said regulator passage, and a check valve disposed in parallel with said normally open switching valve for allowing the brake fluid from said regulator chamber to said assisting chamber, and blocking the reverse flow.

6. A brake apparatus as set forth in claim 5, wherein said first control valve and said second control valve comprise a normally closed linear control valve, respectively.

7. A brake apparatus for a vehicle comprising:
   a master cylinder having a master piston moved in response to operation of a manually operated braking member, and defining a master pressure chamber in front of said master piston and an assisting chamber behind said master piston, to discharge a master cylinder pressure from said master pressure chamber in response to advancing movement of said manually operated braking member;
   a hydraulic pressure source for pressurizing brake fluid independently of the operation of said manually operated braking member, to generate a power pressure;
   regulator valve means for introducing the power pressure generated by said hydraulic pressure source into a regulator chamber in response to the movement of said master piston, to discharge a regulator pressure from said regulator chamber, said regulator chamber being communicated with said assisting chamber to be capable of applying the regulator pressure to said assisting chamber;
   a wheel brake cylinder operatively mounted on a wheel of said vehicle, and included in at least one hydraulic pressure circuit system to be communicated with said master pressure chamber;
   a normally open switching valve disposed in a passage between said master pressure chamber and said wheel brake cylinder in said one hydraulic pressure circuit system;
   a power pressure passage for communicating said hydraulic pressure source with said assisting chamber to be capable of introducing the power pressure discharged from said hydraulic pressure source into said assisting chamber;
   a first control valve disposed in said power pressure passage for controlling the hydraulic pressure in said assisting chamber to be increased;
   a regulator pressure passage for communicating said regulator chamber with said assisting chamber to be capable of introducing the regulator pressure discharged from said regulator chamber into said assisting chamber; and
   a second control valve disposed in said regulator pressure passage for controlling the hydraulic pressure in said assisting chamber to be decreased;

wherein when said manually operated braking member is in an inoperative state thereof, said first control valve is placed in an open position thereof to supply the power pressure discharged from said hydraulic pressure source to said assisting chamber, to advance said master piston and said manually operated braking member.

8. A brake apparatus as set forth in claim 7, wherein another wheel brake cylinder included in another hydraulic pressure circuit system is connected to said regulator pressure passage between said second control valve and said assisting chamber.

9. A brake apparatus as set forth in claim 8, wherein a normally closed switching valve is disposed in a passage between said wheel brake cylinder included in said one hydraulic pressure circuit system and said another wheel brake cylinder included in said another hydraulic pressure circuit system.

10. A brake apparatus as set forth in claim 7, wherein a check valve disposed in parallel with said second control valve for allowing the brake fluid from said regulator chamber to said assisting chamber, and blocking the reverse flow.

11. A brake apparatus as set forth in claim 10, wherein said first control valve comprises a normally closed linear control valve, and said second control valve comprises a normally open linear control valve, respectively.

* * * * *